United States Patent
Rodriguez

(10) Patent No.: US 11,734,916 B1
(45) Date of Patent: Aug. 22, 2023

(54) METHODS AND SYSTEMS FOR DETERMINING THE AUTHENTICITY OF AN IDENTITY DOCUMENT

(71) Applicant: Raphael A. Rodriguez, Marco Island, FL (US)

(72) Inventor: Raphael A. Rodriguez, Marco Island, FL (US)

( * ) Notice: Subject to any disclaimer, the term of this patent is extended or adjusted under 35 U.S.C. 154(b) by 0 days.

(21) Appl. No.: 18/177,989

(22) Filed: Mar. 3, 2023

Related U.S. Application Data

(63) Continuation-in-part of application No. 18/096,644, filed on Jan. 13, 2023, which is a continuation-in-part of application No. 17/959,731, filed on Oct. 4, 2022.

(51) Int. Cl.
*G06V 10/776* (2022.01)
*G06V 10/764* (2022.01)
*G06K 7/14* (2006.01)
*G06V 10/56* (2022.01)
*G06V 30/42* (2022.01)
*G06V 30/413* (2022.01)

(52) U.S. Cl.
CPC ......... *G06V 10/776* (2022.01); *G06K 7/1413* (2013.01); *G06V 10/56* (2022.01); *G06V 10/764* (2022.01); *G06V 30/413* (2022.01); *G06V 30/42* (2022.01)

(58) Field of Classification Search
CPC .... G06V 10/776; G06V 10/56; G06V 10/764; G06V 30/413; G06V 30/42; G06K 7/1413
See application file for complete search history.

(56) References Cited

U.S. PATENT DOCUMENTS

| | | | |
|---|---|---|---|
| 2010/0062194 A1* | 3/2010 | Sun | B42D 25/387 977/773 |
| 2017/0262861 A1* | 9/2017 | Simske | G09C 5/00 |
| 2018/0219681 A1* | 8/2018 | Geiman | H04L 9/3231 |

* cited by examiner

*Primary Examiner* — Matthew Mikels
(74) *Attorney, Agent, or Firm* — Kevin McDermott, Esq.

(57) ABSTRACT

A method for determining the authenticity of an identity document is provided that includes capturing, by an electronic device, image data of an identity document. The identity document has a first side and a second side. The image data includes an image of the first side and an image of the second side. The first side includes data about a person associated with the identity document and second side includes a PDF417 barcode which has features. The method also includes determining a class of the identity document. The features of the PDF417 barcode adhere to criteria established for the determined class of the identity document. Moreover, the method includes analyzing the features of the PDF417 barcode for anomalies. In response to determining the features of the PDF417 barcode are free of anomalies, the identity document is determined to be authentic. Otherwise, the identity document is determined to be fraudulent.

6 Claims, 8 Drawing Sheets

86 ↘

| | PDF417 FEATURES |
|---|---|
| 1. | DIMENSIONS |
| 2. | LOCATIONS — 88 |
| 3. | ORIENTATION |
| 4. | REFLECTION CHARACTERISTICS |
| 5. | COLOR SPECTRUM |
| 6. | ROWS |
| 7. | COLUMNS |
| 8. | CLUSTERS |
| 9. | PRINTED SYMBOLS |
| 10. | CODEWORD MEASUREMENTS |
| 11. | X AND Y- DIMENSIONS |
| 12. | INFORMATION OBTAINED FROM DOCUMENT |

FIG. 5

METHODS AND SYSTEMS FOR DETERMINING THE AUTHENTICITY OF AN IDENTITY DOCUMENT

CROSS REFERENCE TO RELATED APPLICATIONS

This is a continuation-in-part application of U.S. patent application Ser. No. 18/096,644, filed Jan. 13, 2023, which is a continuation-in-part application of U.S. patent application Ser. No. 17/959,731, filed Oct. 4, 2022, the disclosures of which are incorporated herein by reference.

BACKGROUND OF THE INVENTION

This invention relates generally to authenticating identity documents, and more particularly, to methods and systems for determining the authenticity of an identity document.

Individuals conduct transactions with many different service providers in person and remotely over the Internet. Network-based transactions conducted over the Internet may involve, for example, opening a bank account or similar account using a website or mobile application. Service providers typically require successfully identifying an individual before he or she is permitted to open a bank account or conduct any other type of network-based transaction involving sensitive information.

Service providers typically require individuals to upload an image of his or her identity document, like a driver's license or a passport, and a claim of identity to facilitate authentication. The uploaded images are typically analyzed to determine whether the identity document in the uploaded image is authentic jurisdictionally accurate, and unexpired. The analysis may be manual or automatic.

Imposters have been known to impersonate individuals by providing a false claim of identity supported by a fraudulent identity document when attempting to deceive a service provider into concluding the imposter is the person he or she claims to be. Such impersonations are known as spoofing. Additionally, impostors have been known to use many methods to obtain or create fraudulent identity documents. For example, imposters have been known to alter identity documents by laminating another person's image onto their own identity document or to change the text of another person's identity document. The imposters upload images of the altered documents, for example, when attempting to open a bank account. Such fraudulent identity documents are difficult to detect using known techniques. Consequently, opening a banking account or other type of similar account with an uploaded image of an identity document captured at a remote location depends on verifying the identity document in the uploaded image is authentic.

Known methods for determining the authenticity of an identity document included in an image may analyze various features of the document, for example, the text font, presence of security features, and color spectrum, and may verify the uploaded image was not taken of a photocopy. The features may be analyzed manually or automatically.

However, manually reviewing uploaded identity documents is slow, inefficient, not scalable, and very expensive. Additionally, known methods of automatically analyzing identity documents typically generate results that are not as accurate and trustworthy as desired.

Thus, it would be advantageous and an improvement over the relevant technology to provide a method and a computer capable of enhancing the accuracy and trustworthiness of authenticity detection results, enhancing security, facilitating a reduction in identity document review costs, and facilitating a reduction in costs incurred due to successful spoofing attacks.

BRIEF DESCRIPTION OF THE INVENTION

An aspect of the present disclosure provides a method for determining the authenticity of an identity document comprising the step of capturing, by an electronic device, image data of an identity document. The identity document has a first side and a second side. The image data includes an image of the first side and an image of the second side, wherein the first side includes data about a person associated with the identity document and the second side includes a PDF417 barcode. The PDF417 barcode includes features.

Moreover, the method includes the step of determining a class of the identity document. The features of the PDF417 barcode adhere to criteria established for the determined class of document. Furthermore, the method includes the step of analyzing the features of the PDF417 barcode for anomalies, and in response to determining the features of the PDF417 barcode are free of anomalies, determining the identity document is authentic. In response to determining the features of the PDF417 barcode have at least one anomaly, the identity document is determined to be fraudulent.

In one embodiment of the present disclosure the step of determining a class of the identity document includes the step of determining the identity document is a type of document.

In another embodiment of the present disclosure the features include the dimensions, location, and orientation of the PDF417 barcode, and the analyzing step includes the steps of measuring the dimensions of the PDF417 barcode, determining the location of the PDF417 barcode on the identity document, determining the orientation of the PDF417 barcode on the identity document, and comparing the measured dimensions against the respective criteria for PDF barcodes on the determined class of document. Moreover, the method includes the steps of comparing the determined location against the respective criteria for PDF barcodes on the determined class of document and comparing the determined orientation against the respective criteria for PDF barcodes on the determined class of document. In response to determining the measured dimensions, determined location, or determined orientation is out of compliance with the respective criteria, the PDF417 barcode is determined to have at least one anomaly.

In yet another embodiment of the present disclosure, the features include X and Y-dimensions of the PDF417 barcode, and the analyzing step includes the steps of measuring the X and Y-dimensions of the PDF417 barcode and comparing the measured X and Y-dimensions against the respective criteria for PDF barcodes on the determined class of document. In response to determining the measured X and Y-dimensions are out of compliance with the respective criteria, the PDF417 barcode is determined to have at least one anomaly.

In another embodiment of the present disclosure, the features include reflection characteristics of the PDF417 barcode, and the analyzing step includes the steps of analyzing the captured image to determine whether light incident on the PDF417 barcode during the capturing step reflected off the PDF417 barcode as diffuse or specular light. In response to determining the light reflected off the PDF417 barcode as diffuse light, the PDF417 barcode is determined to have at least one anomaly.

In yet another embodiment of the present disclosure, the features include data obtained from the first side of the identity document. The analyzing step includes the steps of obtaining data from the first side of the identity document. The obtained data includes at least the determined class of the identity document and the entity that issued the identity document. The analyzing step further includes using the PDF417 barcode to determine an expected class of the identity document and an expected entity that issued the identity document, comparing the obtained class of the identity document against the expected class of the identity document, and comparing the obtained entity against the expected entity. In response to determining the obtained and expected class disagree or the obtained and expected entity disagree, the PDF417 barcode is determined to have at least one anomaly.

In another embodiment of the present disclosure the features include measurements of printed symbols of the PDF417 barcode, and the analyzing step includes the steps of measuring the printed symbols of the PDF417 barcode across at least one row of the PDF417 barcode and comparing the measurements against the respective criteria for PDF barcodes on the determined class of document. In response to determining the measurements are out of compliance with the respective criteria, the PDF417 barcode is determined to have at least one anomaly.

In another embodiment of the present disclosure the features include numbers of rows, columns, and clusters of the PDF417 barcode, and the analyzing step includes the steps of counting the numbers of rows, columns, and clusters included in the PDF417 barcode, and comparing the numbers against the respective criteria for PDF barcodes on the determined class of document. In response to determining any of the numbers is out of compliance with the respective criteria, the PDF417 barcode is determined to have at least one anomaly.

In another embodiment of the present disclosure the features include measurements of codewords in the PDF417 barcode and the analyzing step includes the steps of measuring each codeword in the PDF417 barcode and comparing the measurements against the respective criteria for PDF barcodes on the determined class of document. In response to determining any of the codeword measurements is out of compliance with the respective criteria, the PDF417 barcode is determined to have at least one anomaly.

In another embodiment of the present disclosure the features include a color spectrum for all rows and columns in the PDF417 barcode and the analyzing step includes the steps of measuring the color spectrum for each pixel included in the rows and columns, and comparing the measurements against the respective criteria for PDF417 barcodes on the determined class of document. In response to determining any of the pixels is out of compliance with the respective criteria the PDF417 barcode is determined to have at least one anomaly.

In yet another embodiment of the present disclosure the identity document includes a Guilloche pattern extending into the margin.

In another embodiment of the present disclosure text is in the margin and the method further includes measuring the color spectrum of pixels in the margin, analyzing a pattern of illumination across the margin using the color spectrum measurements, and comparing results of the analysis against the respective criteria for barcodes on the determined class of document. In response to determining all of the results comply with the respective criteria, the method includes determining the identity document is authentic.

Another aspect of the present disclosure provides a non-transitory computer-readable recording medium in an electronic device for determining authenticity of an identity document. The non-transitory computer-readable recording medium stores instructions which when executed by a hardware processor perform the steps of the methods described above.

Another aspect of the present disclosure provides an electronic device for determining authenticity of an identity document including a processor and a memory configured to store data. The electronic device is associated with a network and the memory is in communication with the processor and has instructions stored thereon which, when read and executed by the processor, cause the electronic device to receive image data of an identity document. The identity document has a first side and a second side. The image data includes an image of the first side and an image of the second side, wherein the first side includes data about a person associated with the identity document and the second side includes a PDF417 barcode. The PDF417 barcode includes features.

Moreover, the instructions when read and executed by the processor, cause the electronic device to determine a class of the identity document. The features of the PDF417 adhere to criteria established for the determined class of document. Furthermore, the instructions when read and executed by the processor, cause the electronic device to analyze the features of the PDF417 barcode for anomalies and in response to determining the features of the PDF417 barcode are free of anomalies, determine the identity document is authentic. In response to determining the features of the PDF417 barcode have at least one anomaly, the PDF417 barcode is determined to have at least one anomaly.

In an embodiment of the present disclosure, the instructions when read and executed by the processor, further cause the electronic device to determine the identity document is a type of document.

In another embodiment of the present disclosure, the features include the dimensions, location, and orientation of the PDF417 barcode on the identity document. The instructions when read and executed by the processor, further cause the electronic device to measure the dimensions of the PDF417 barcode, determine the location of the PDF417 barcode on the identity document, and determine the orientation of the PDF417 barcode on the identity document. Moreover, the instructions when read and executed by the processor cause the electronic device to compare the measured dimensions against the respective criteria for PDF barcodes on the determined class of document, compare the determined location against the respective criteria for PDF barcodes on the determined class of document, and compare the determined orientation against the respective criteria for PDF barcodes on the determined class of document. In response to determining the measured dimensions, determined location, or determined orientation is out of compliance with the respective criteria, the PDF417 barcode is determined to have at least one anomaly.

In another embodiment of the present disclosure, the features include X and Y-dimensions of the PDF417 barcode. The instructions when read and executed by the processor, further cause the electronic device to measure the X and Y-dimensions of the PDF417 barcode and compare the measured X and Y-dimensions against the respective criteria for PDF barcodes on the determined class of document. In response to determining the measured X and Y-dimensions are out of compliance with the respective criteria, the PDF417 barcode is determined to have at least one anomaly.

In another embodiment of the present disclosure, the features include reflection characteristics of the PDF417 barcode. The instructions when read and executed by the processor, further cause the electronic device to analyze the captured image to determine whether light incident on the PDF417 barcode during image capture reflected off the PDF417 barcode as diffuse or specular light. In response to determining the light reflected off the PDF417 barcode as diffuse light, the PDF417 barcode is determined to have at least one anomaly.

In another embodiment of the present disclosure, the features include data obtained from the first side of the identity document. The instructions when read and executed by the processor, cause the electronic device to obtain data from the first side of the identity document. The obtained data includes at least the determined class of the identity document and the entity that issued the identity document. The instructions when read and executed by the processor, further cause the electronic device to use the PDF417 barcode to determine an expected class of the identity document and an expected entity that issued the identity document, and to compare the obtained class of the identity document against the expected class of the identity document. In response to determining the obtained and expected class disagree or the obtained and expected entity disagree, the PDF417 barcode is determined to have at least one anomaly.

In another embodiment of the present disclosure, the features include measurements of printed symbols in the PDF417 barcode. The instructions when read and executed by the processor, cause the electronic device to measure the printed symbols in the PDF417 barcode across at least one row of the PDF417 barcode and compare the measurements against the respective criteria for PDF barcodes on the determined class of document. In response to determining the measurements are out of compliance with the respective criteria, the PDF417 barcode is determined to have at least one anomaly.

In another embodiment of the present disclosure, the features include numbers of rows, columns, and clusters in the PDF417 barcode. The instructions when read and executed by the processor, cause the electronic device to count the numbers of rows, columns, and clusters in the PDF417 barcode and compare the numbers against the respective criteria for PDF barcodes on the determined class of document. In response to determining any of the numbers is out of compliance with the respective criteria, the PDF417 barcode is determined to have at least one anomaly.

In another embodiment of the present disclosure, the features include measurements of codewords in the PDF417 barcode. The instructions when read and executed by the processor, cause the electronic device to measure each codeword in the PDF417 barcode and compare the measurements against the respective criteria for PDF barcodes on the determined class of document. In response to determining any of the codeword measurements is out of compliance with the respective criteria, the PDF417 barcode is determined to have at least one anomaly.

In another embodiment of the present disclosure, the features include a color spectrum for all rows and columns in the PDF417 barcode. The instructions when read and executed by the processor, cause the electronic device to measure the color spectrum for each pixel included in the rows and columns and compare the measurements against the respective criteria for PDF barcodes on the determined class of document. In response to determining any of the pixels is out of compliance with the respective criteria, the PDF417 barcode is determined to have at least one anomaly.

In another embodiment of the present disclosure, the identity document includes a Guilloche pattern extending into the margin.

In another embodiment of the present disclosure, text is in the margin and the instructions when read and executed by said processor cause the electronic device to measure the color spectrum of pixels in the margin, analyze a pattern of illumination across the margin using the color spectrum measurements, and compare results of the analysis against the respective criteria for barcodes on the determined class of document. In response to determining all of the results comply with the respective criteria, the identity document is determined to be authentic.

Another aspect of the present disclosure provides a method for determining the authenticity of an identity document including the steps of capturing, by an electronic device, image data of an identity document. The identity document is one of a plurality of different card types and has a first side and a second side. The image data includes an image of the first side and an image of the second side, the first side includes data about a person associated with the identity document and the second side includes a PDF417 barcode. The PDF417 barcode includes features, at least one side and a margin along the at least one side. Moreover, the method includes the step of determining a class of the one card type. The features of the PDF417 barcode adhere to criteria established for the determined class. Furthermore, the method includes analyzing illumination characteristics of the captured image at the margin, comparing results of the analyzing step against the respective criteria for PDF417 barcodes on the determined class of document, and determining the identity document is authentic or fraudulent based on the comparing step.

Another aspect of the present disclosure provides a non-transitory computer-readable recording medium in an electronic device capable determining the authenticity of identity documents. The non-transitory computer-readable recording medium stores instructions which when executed by a hardware processor performs the steps of the method described above.

Another aspect of the present disclosure provides an electronic device for determining authenticity of an identity document including a processor and a memory configured to store data. The electronic device is associated with a network and the memory is in communication with the processor and has instructions stored thereon which, when read and executed by the processor, cause the electronic device to capture image data of an identity document. The identity document is one of a plurality of different card types and has a first side and a second side. The image data includes an image of the first side and an image of the second side, wherein the first side includes data about a person associated with the identity document and the second side includes a PDF417 barcode. The PDF417 barcode includes features, at least one side and a margin along the at least one side.

Moreover, the instructions when read and executed by the processor, cause the electronic device to determine a class of the card type. The features of the PDF417 barcode adhere to criteria established for the determined class. Furthermore, the instructions when read and executed by the processor, cause the electronic device to analyze illumination characteristics of the captured image at the margin, compare results of the analysis against the respective criteria for PDF417 barcodes on the determined class of document, and determine the identity document is authentic or fraudulent based on the comparison.

BRIEF DESCRIPTION OF THE DRAWINGS

FIG. 5 is a diagram illustrating a table including example features relating to the PDF417 barcode as shown in FIG. 4;

DETAILED DESCRIPTION OF THE INVENTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the example embodiments described herein can be made without departing from the spirit and scope of the present disclosure.

Figure 1:
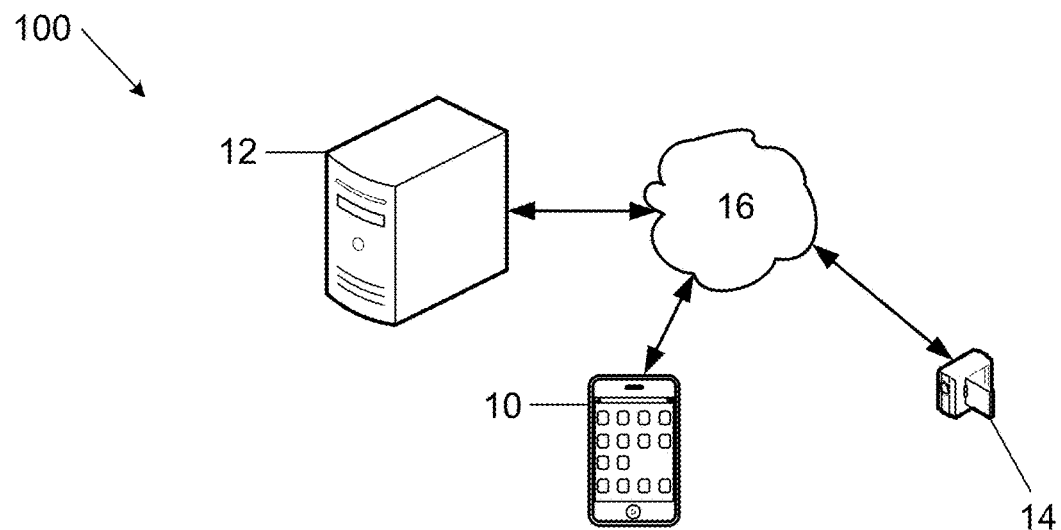
FIG. 1 is a schematic diagram of an example computing system for determining the authenticity of an identity document according to an embodiment of the present disclosure.

FIG. 1 is a schematic diagram of an example computing system 100 for determining the authenticity of an identity document according to an embodiment of the present disclosure. As shown in FIG. 1, the main elements of the system 100 include an electronic device 10, a server 12, and a camera 14 communicatively connected via a network 16.

In FIG. 1, the electronic device 10 can be any electronic device capable of at least downloading applications over the Internet, running applications, capturing and storing data temporarily and/or permanently, and otherwise performing any and all functions, methods and/or algorithms described herein by any computer, computer system, server or electronic device that may be included in the system 100. For example, the electronic device 10 may be any type of server or computer implemented as a network server or network computer. Other examples of the electronic device 10 include, but are not limited to, a cellular phone, any wireless hand-held consumer electronic device, a smart phone, a tablet computer, a phablet computer, a laptop computer, and a personal computer (PC).

The electronic device 10 is typically associated with a single person who operates the device 10. The person who is associated with and operates the electronic device 10 is referred to herein as a user.

The server 12 can be, for example, any type of server or computer implemented as a network server or network computer. The camera 14 may be any type of camera capable of capturing any kind of image data and audio data. The server 12 and camera 14 are electronic devices so each may be alternatively referred to as an electronic device. Additionally, the electronic device 10, the server 12, and the camera 14 may each be considered information systems so may alternatively be referred to as an information system.

The network 16 may be implemented as a 5 G communications network. Alternatively, the network 16 may be implemented as any wireless network including, but not limited to, 4 G, 3 G, Wi-Fi, Global System for Mobile (GSM), Enhanced Data for GSM Evolution (EDGE), and any combination of a LAN, a wide area network (WAN) and the Internet. The network 16 may also be any type of wired network or a combination of wired and wireless networks.

It is contemplated by the present disclosure that the number of electronic devices 10, servers 12, and cameras 14 is not limited to the number shown in the system 100. Rather, any number of electronic devices 10, servers 12, and cameras 14 may be included in the system 100.

Figure 2:
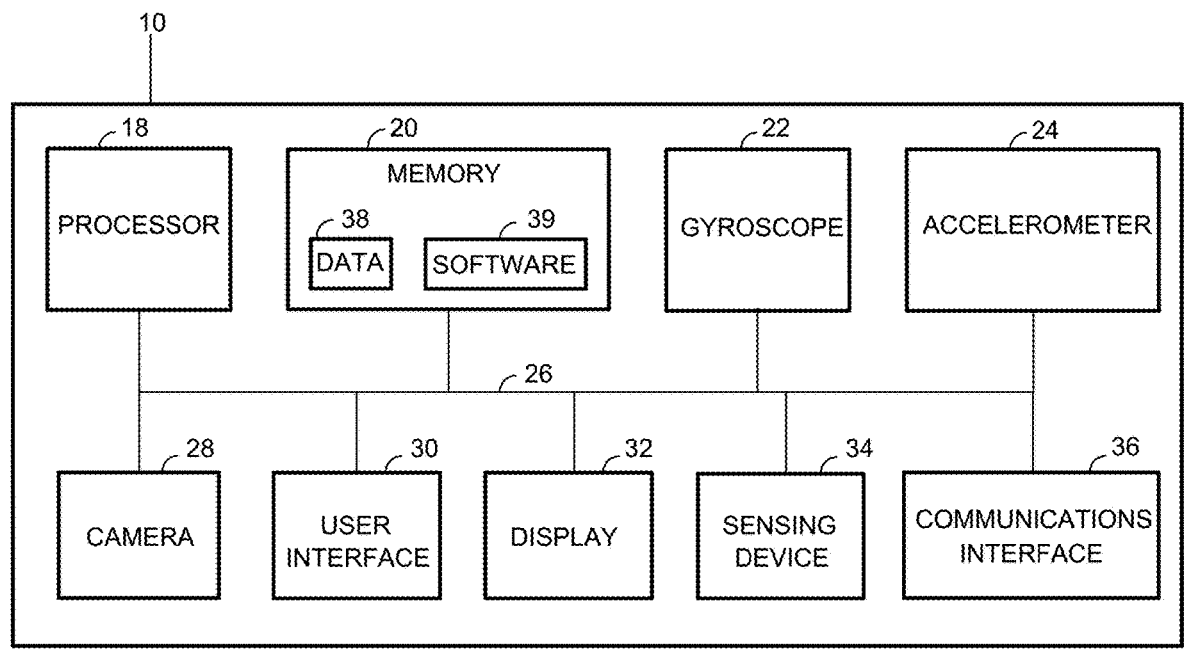
FIG. 2 is a schematic diagram of an example electronic device included in the system shown in FIG. 1.

FIG. 2 is a more detailed schematic diagram of the electronic device 10 for determining the authenticity of an identity document according to an embodiment of the present disclosure. The computing device 10 includes components such as, but not limited to, one or more processors 18, a memory 20, a gyroscope 22, an accelerometer 24, a bus 26, a camera 28, a user interface 30, a display 32, a sensing device 34, and a communications interface 36. General communication between the components in the computing device 10 is provided via the bus 26.

The electronic device 10 can be any electronic device capable of at least downloading applications over the Internet, running applications, capturing and storing data temporarily and/or permanently, and otherwise performing any and all functions described herein by any computer, computer system, server or electronic device. For example, the electronic device 10 may be any type of server or computer implemented as a network server or network computer.

Other examples include, but are not limited to, a cellular phone, any wireless hand-held consumer electronic device, a smart phone, a tablet computer, a phablet computer, a laptop computer, and a personal computer (PC).

The processor 18 executes software instructions, or computer programs, stored in the memory 20. As used herein, the term processor is not limited to just those integrated circuits referred to in the art as a processor, but broadly refers to a computer, a microcontroller, a microcomputer, a programmable logic controller, an application specific integrated circuit, and any other programmable circuit capable of executing at least a portion of the functions and/or methods described herein. The above examples are not intended to limit in any way the definition and/or meaning of the term "processor."

The memory 20 may be any non-transitory computer-readable recording medium. Non-transitory computer-readable recording media may be any tangible computer-based device implemented in any method or technology for short-term and long-term storage of information or data. Moreover, the non-transitory computer-readable recording media may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), and disc drive or the like. Furthermore, the non-transitory computer-readable recording media may be implemented as smart cards, SIMs, any type of physical and/or virtual storage, or any other digital source such as a network or the Internet from which computer programs, applications or executable instructions can be read.

The memory 20 may be used to store any type of data 38, for example, data records of users and a database of images in which each image is of an identity document. Each data record is typically for a respective user. The data record for each user may include data such as, but not limited to, the user's name, personal data, and images of identity documents associated with the user. Identity documents include, but are not limited to, passports, driver's licenses, and identity cards.

The term "personal data" as used herein includes any demographic information regarding a user as well as contact information pertinent to the user. Such demographic information includes, but is not limited to, a user's name, age, date of birth, street address, email address, citizenship, marital status, and contact information. Contact information can include devices and methods for contacting the user.

Additionally, the memory 20 can be used to store any type of software 39. As used herein, the term "software" is intended to encompass an executable computer program that exists permanently or temporarily on any non-transitory computer-readable recordable medium that causes the electronic device 10 to perform at least a portion of the functions, methods, and/or algorithms described herein. Application programs are software and include, but are not limited to, operating systems, Internet browser applications, computer programs that analyze and determine the authenticity of identity documents, and any other software and/or any type of instructions associated with algorithms, processes, or operations for controlling the general functions and operations of the electronic device 10. The software may also include computer programs that implement buffers and use RAM to store temporary data.

The camera 22 captures image data. As used herein, capture means to record data temporarily or permanently, for example, image data of identity documents. The camera 22 can be one or more imaging devices configured to record image data of identity documents of a user while utilizing the computing device 10. Moreover, the camera 22 is capable of recording image data under any lighting conditions including infrared light. The camera 22 may be integrated into the computing device 10 as one or more front-facing cameras and/or one or more rear facing cameras that each incorporates a sensor, for example and without limitation, a CCD or CMOS sensor. Alternatively, the camera 22 can be external to the computing device 10. Image data of identity documents includes at least images of the documents.

The user interface 30 and the display 32 allow interaction between a user and the electronic device 10. The display 32 may include a visual display or monitor that displays information. For example, the display 32 may be a Liquid Crystal Display (LCD), an active matrix display, plasma display, or cathode ray tube (CRT). The user interface 30 may include a keypad, a camera, a keyboard, a mouse, an illuminator, a signal emitter, a microphone, and/or speakers.

Moreover, the user interface 30 and the display 32 may be integrated into a touch screen display. Accordingly, the display may also be used to show a graphical user interface, which can display various data and provide "forms" that include fields that allow for the entry of information by the user. Touching the screen at locations corresponding to the display of a graphical user interface allows the person to interact with the electronic device 10 to enter data, change settings, control functions, etc. Consequently, when the touch screen is touched, the user interface 30 communicates this change to the processor 18 and settings can be changed or user entered information can be captured and stored in the memory 20.

The sensing device 34 may include Radio Frequency Identification (RFID) components or systems for receiving information from other devices (not shown) and for transmitting information to other devices. The sensing device 34 may alternatively, or additionally, include components with Bluetooth, Near Field Communication (NFC), Zigbee communication protocol, infrared, or other similar capabilities. Communications between the electronic device 10 and other devices (not shown) may occur via NFC, RFID, Bluetooth, Zigbee communication protocol, or the like only so a network connection from the electronic device 10 is unnecessary.

The communications interface 36 may include various network cards, and circuitry implemented in software and/or hardware to enable wired and/or wireless communications with other devices (not shown). Communications include, for example, conducting cellular telephone calls and accessing the Internet over a network. By way of example, the communications interface 24 may be a digital subscriber line (DSL) card or modem, an integrated services digital network (ISDN) card, a cable modem, or a telephone modem to provide a data communication connection to a corresponding type of telephone line. As another example, the communications interface 36 may be a local area network (LAN) card (e.g., for Ethernet.TM. or an Asynchronous Transfer Model (ATM) network) to provide a data communication connection to a compatible LAN. As yet another example, the communications interface 36 may be a wire or a cable connecting the electronic device 10 with a LAN, or with accessories such as, but not limited to, other electronic devices. Further, the communications interface 36 may include peripheral interface devices, such as a Universal Serial Bus (USB) interface, a PCMCIA (Personal Computer Memory Card International Association) interface, and the like.

The communications interface 36 also allows the exchange of information across a network between the electronic device 10 and any other device (not shown). The exchange of information may involve the transmission of radio frequency (RF) signals through an antenna (not shown).

Identity documents may be one of three different card types. The card types are ID-1, ID-2, and ID-3. International standards defining the size of each card type have been established. For example, the international standard for ID-1 card types requires that the card be rectangular with dimensions of 85.60 millimeters (mm) by 53.98 mm, and have rounded corners with a radius in the range of 2.88 mm to 3.48 mm. Cards implemented using the ID-1 card type standard include, but are not limited to, credit cards, debit cards, identification cards, hunting licenses and driver's licenses. Example implementations of the ID-2 card type standard include travel visas and Romanian identity cards. An example implementation of the ID-3 card type standard is a passport.

Each different implementation using the ID-1 card type standard may be considered a different class. As a result, there are several hundred different classes. For example, driver's licenses implemented using the ID-1 standard may be considered one class, credit cards implemented using the ID-1 standard may be considered another class, and hunting licenses implemented using the ID-1 standard may represent yet another class.

It is contemplated by the present disclosure that the driver's license implemented using the ID-1 standard issued by each U.S. state constitutes a different class. Thus, for example, a driver's license issued by the state of California belongs to a different class than a driver's license issued by the state of Florida. Similarly, the driver's licenses issued by different provinces, for example, in Canada constitute different classes. Thus, for example, a driver's license issued by the province of Quebec belongs to a different class than a driver's license issued by the province of Ontario. Moreover, driver's licenses issued in different years constitute a different class. Thus, for example, a California driver's license issued in 2018 belongs to a different class than a California driver's license issued in 2021. Commercial driver's licenses also constitute a different class of document.

Figure 3:
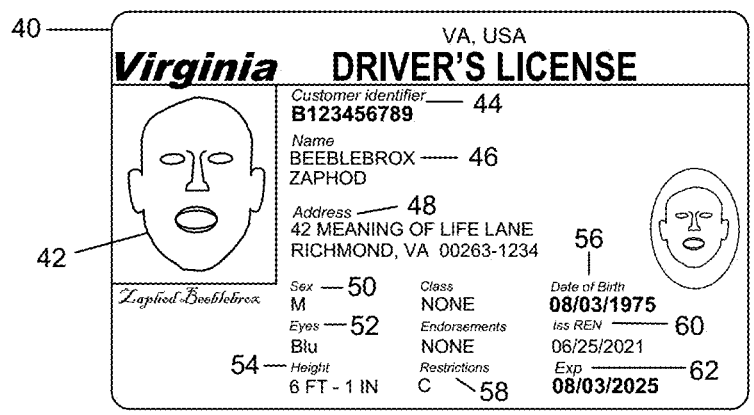
FIG. 3 is a diagram illustrating the first side of an example identity document.

FIG. 3 is a diagram illustrating an image of an example identity document 40 implemented using the ID-1 card type standard. A first side of the identity document 40 is shown. The example identity document 40 is a driver's license. However, it is contemplated by the present disclosure that the identity document 40 may alternatively be any identity document used by a person to prove a claim of identity, for example, a passport or an identification card. The image may be captured with the electronic device 10, the camera 14 or any other device included in the system 100 capable of communicating with the server 12 via the network 16.

The identity document 40 includes an image 42 of the person to whom the identity document was issued and other information about the person. The other information includes a customer identifier 44 as well as the person's name 46, address 48, sex 50, eye color 52, height 54, and date of birth 56. Additionally, the identity document 40 includes restrictions 58 the person is required to comply with while driving, the issue renewal date 60, and the expiration date 62. Any textual information included on the first side of the identity document 40 may be obtained from the image using optical character recognition (OCR) techniques. The information on the first side of the identity document 40 complies with the established criteria for the class of the identity document 40.

Figure 4:
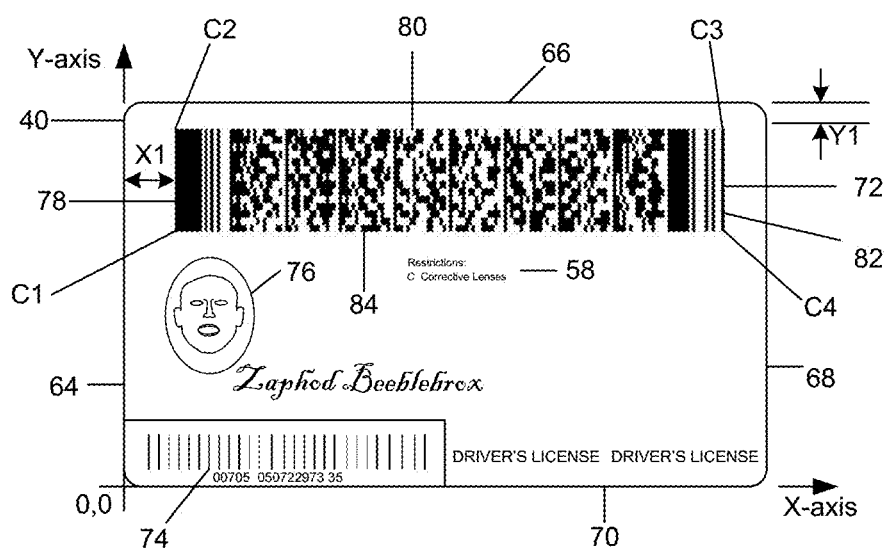
FIG. 4 is a diagram illustrating an example second side of the identity document as shown in FIG. 3, including an example PDF417 barcode.

FIG. 4 is a diagram illustrating an image of an example second side of the identity document 40 implemented using the ID-1 card type standard. The image may be captured with the electronic device 10, the camera 14 or any other device included in the system 100 capable of communicating with the server 12 via the network 16.

The identity document 40 has a left edge 64, a top edge 66, a right edge 68, and a bottom edge 70. A cartesian coordinate system including X and Y-axes may be mathematically positioned anywhere on or with respect to the second side of the identity document 40. The second side includes a PDF417 barcode 72, a one-dimensional barcode 74, an image 76 of the person for whom the license was issued, and the restrictions 58 the person is required to comply with while driving. The cartesian coordinate system may be used to facilitate calculating the dimensions of the PDF417 barcode, the location of the PDF417 barcode on the second side, and the orientation of the PDF417 barcode on the second side of the identity document 40. The information on the second side of the identity document 40 complies with the established criteria for the class of the identity document 40.

The PDF417 barcode 72 is rectangular so has four corners C1, C2, C3, and C4 and four rectangular sides. The PDF417 barcode includes a first rectangular side 78, a second rectangular side 80, a third rectangular side 82 and a fourth rectangular side 84. The first rectangular side 78 is parallel to the left edge 64, the second rectangular side 80 is parallel to the top edge 66, the third rectangular side 82 is parallel to the right edge 68, and the fourth rectangular side 84 is parallel to the bottom edge 70.

The dimensions 88 of the PDF417 barcode 72 can be calculated from the corners C1, C2, C3, and C4. Alternatively, the dimensions can be calculated in any manner, for example, by measuring the lengths of the rectangular sides 78, 80, 82, and 84. Additionally, the PDF417 barcode 72 is located a distance X1 from the left edge 64 and a distance Y1 from the top edge 66, and is oriented so the rectangular sides 78, 80, 82, and 84 are parallel to the edges 64, 66, 68, and 70.

Service providers typically require individuals to upload an image of his or her identity document, like a driver's license or a passport, and a claim of identity to facilitate authentication. The uploaded images are typically analyzed to determine whether the identity document in the uploaded image is authentic. Imposters have been known to impersonate individuals by providing a false claim of identity supported by fraudulent identity documents when attempting to deceive a service provider into concluding the imposter is the person he or she claims to be. Additionally, impostors have been known to use many methods to obtain or create fraudulent identity documents. For example, imposters have been known to laminate another person's image onto their own identity document or to alter the text of another person's identity document. The imposters upload images of the altered documents, for example, when opening a bank account. Such fraudulent identity documents are difficult to detect by known systems.

Methods for automatically determining the authenticity of an identity document included in an image are known to analyze various features of the document. For example, such methods are known to analyze the text font to verify it comports with the appropriate standards for the respective class of document, determine whether security features are present, determine whether the color spectrum of the document is proper, and verify that the uploaded image was not taken of a photocopy. However, these methods generate less robust authenticity results than desired which can result in compromised security.

To address these problems the electronic device 10 may capture image data of an identity document 40 having first and second sides. The image data can include an image of the first side and an image of the second side. The first side can include data about a person associated with the identity document 40 and the second side can include the PDF417 barcode 72. It is contemplated by the present disclosure that the PDF417 barcode 72 adheres to criteria established for the determined class of document and has several features that can be analyzed.

A class of the identity document can be determined and the features of the PDF417 barcode can be analyzed for anomalies with the established criteria for the determined class of document. Any difference from the established criteria is considered an anomaly. In response to determining the features of the PDF417 barcode are free of anomalies, the identity document can be determined to be authentic. However, in response to determining the features of the PDF417 barcode have at least one anomaly, the identity document can be determined to be fraudulent.

FIG. 5 is a diagram illustrating a table 86 including example features 88 relating to the PDF417 barcode 72. Any one of the features 88, or any combination of the features 88, may be randomly selected and used to determine whether an identity document is authentic. Each of the features 88 is designed to scrutinize various aspects of, or related to, the PDF417 barcode that can be used to facilitate determining whether the identity document is authentic or fraudulent.

The table 86 includes twelve (12) features 88. However, it is contemplated by the present disclosure that fewer features 88 or more features 88 may be included in the table. The features 88 include, but are not limited to, the dimensions of the PDF417 barcode, the location of the PDF417 barcode on the identity document 40, the orientation of the PDF417 barcode on the identity document 40, the reflection characteristics of the PDF417 barcode, the color spectrum of the PDF417 barcode, the number of rows in the PDF417 barcode, the number of columns in the PDF417 barcode, the number of clusters in the PDF417 barcode, printed symbols that make up the PDF417 barcode, measurements of codewords in the PDF417 barcode, the X and Y-dimensions inherent to the PDF417 barcode, and information obtained from the document.

The class of the identity document can be determined and the features 88 of the PDF417 barcode 72 can be analyzed for adherence to criteria established for PDF417 barcodes on the determined class of document. More specifically, the features 88 of the PDF417 barcode 72 can be analyzed for anomalies from the established criteria. For example, the identity document 40 can be classified as a driver's license and the features of the PDF417 barcode can be analyzed for adherence to the established criteria for driver's licenses. Any difference from the established criteria is considered an anomaly. Determining the features 88 of the PDF417 barcode 72 are free of anomalies facilitates determining that the identity document may be authentic. However, determining the features 88 of the PDF417 barcode 72 have at least one anomaly may indicate that the identity document is fraudulent.

Criteria for the dimensions of the PDF417 barcode 72 for each class of type ID-1 card have been established. Additionally, criteria have been established for the location and orientation of the PDF417 barcode 72 on an identity document for each class of type ID-1 cards. The dimensions, location, and orientation of the PDF417 barcode 72 on the identity document 40 are to comply with the established criteria. The dimension, location and orientation information of the PDF417 barcode 72 on the document 40 may be compared against the respective criteria to ensure compliance with the criteria. Compliance of the dimensions, location, and orientation of the PDF417 barcode facilitates determining that the identity document 40 is authentic. Noncompliance of either may indicate the identity document 40 is fraudulent.

Figure 6:
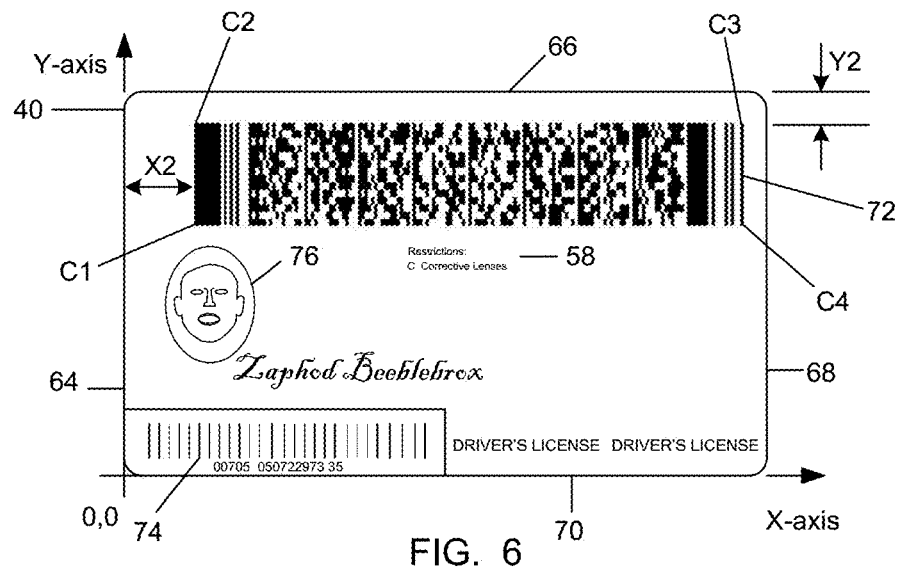
FIG. 6 is a diagram illustrating an example fraudulent second side of the identity document as shown in FIG. 4.
Figure 7:
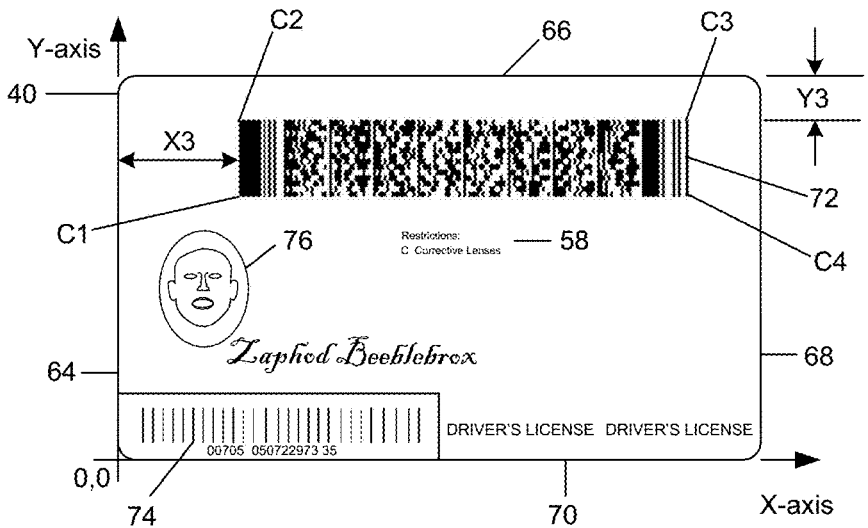
FIG. 7 is a diagram illustrating another example fraudulent second side of the identity document as shown in FIG. 4.
Figure 8:
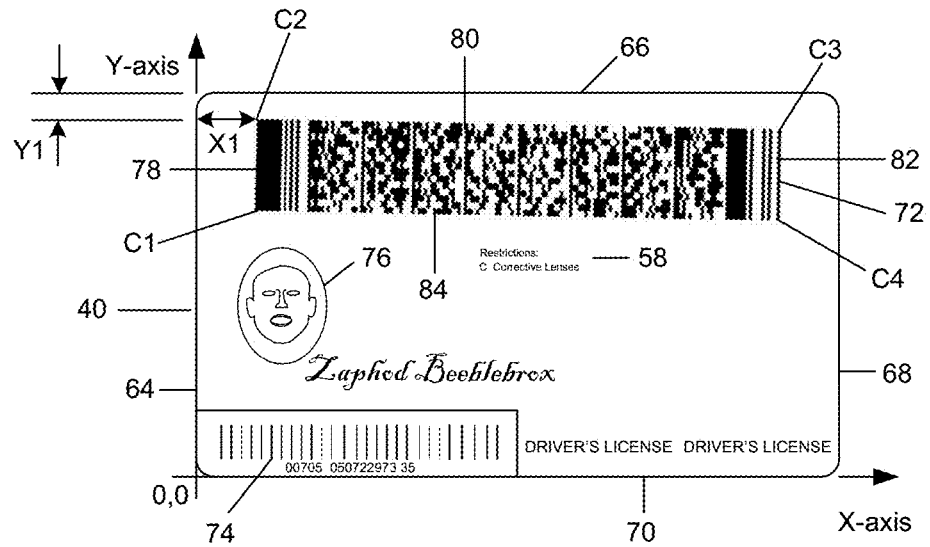
FIG. 8 is a diagram illustrating yet another example fraudulent second side of the identity document as shown in FIG. 4.

The information shown in FIGS. 6, 7, and 8 is the same information shown in FIG. 4 as described in more detail below. As such, features illustrated in FIGS. 6, 7 and 8 that are identical to features illustrated in FIG. 4 are identified using the same reference numerals used in FIG. 4.

FIG. 6 is a diagram illustrating an image of another example second side of the identity document 40 as shown in FIG. 4. The dimensions of the PDF417 barcode 72 comply with the established criteria. However, the PDF417 barcode 72 is offset from the left edge 64 by the distance X2 and from the top edge 66 by the distance Y2, not X1 and Y1, respectively. As a result, the location of the PDF417 barcode 72 on the identity document 40 does not comply with established criteria. Although the dimensions of the PDF417 barcode 72 comply with the established criteria, the location of the PDF417 barcode does not. Consequently, the identity document 40 illustrated in FIG. 6 is considered fraudulent.

FIG. 7 is a diagram illustrating an image of another example second side of the identity document as shown in FIG. 4. However, the dimensions of the PDF417 barcode 72 are smaller than required by the established criteria and the PDF417 barcode 72 is offset from the left edge 64 by the distance X3 and from the top edge 66 by the distance Y3. As a result, neither the dimensions nor the location of the PDF417 barcode 72 on the document 40 comply with the established criteria. As a result, the identity document 40 illustrated in FIG. 7 is considered fraudulent.

FIG. 8 is another diagram illustrating an image of yet another example second side of the identity document as shown in FIG. 4. However, none of the rectangular sides 78, 80, 82, and 84 is parallel to the corresponding edge 64, 66, 68, and 70. As a result, the PDF417 barcode is not properly oriented on the identity document 40 and does not comply with the established criteria for PDF417 barcodes on the identity document 40. As a result, the identity document 40 illustrated in FIG. 8 is considered fraudulent.

The identity document 40 is typically illuminated during image capture. For example, the identity document 40 may be illuminated by light emitted from a screen 32 of the electronic device 10 or perhaps by a flash or infrared light. The illumination characteristics 88 of the PFD417 barcode may be analyzed to facilitate determining whether the identity document 40 is authentic. Illumination characteristics include, but are not limited to, reflections off the PDF417 barcode, the distribution of the intensity of light across the PDF417 barcode or any part of the identity document 40, and patterns in light across the PDF417 barcode or any part of the identity document 40. The black ink of the PDF417 barcode may interact with the polycarbonate substrate of an identity document to generate certain reflections. The reflections generated by an authentic identity document may be different than those generated by a fraudulent identity document due to, for example, different substrate materials. That is, different reflections may indicate that the identity document in a captured image has a substrate different than that required by the established criteria. Such different reflections may facilitate determining that the identity document in the captured image is fraudulent.

Another example of using illumination characteristics of the PDF417 barcode can include reflections off the black and white areas of the PDF417 barcode 72. The difference between the black and white reflections may be calculated for an authentic identity document. Likewise, the difference between the black and white reflections off the PDF417 barcode 72 included in a captured image of an identity document can be calculated. The calculated difference may be compared against each other. More specifically, the difference between the calculated differences may be determined, and if the difference satisfies a threshold the identity document in the captured image may be considered authentic. Otherwise, the identity document may be considered fraudulent. It is contemplated by the present disclosure that any method may alternatively be used to determine the authenticity of an identity document based on reflections off the black and white areas of the PDF417 barcode 72.

The illumination characteristics of the identity document 40 generally may also be used to facilitate determining whether an identity document 40 is authentic. For example, illumination incident on the identity document 40 during capture typically reflects off the document 40 as diffuse or specular reflections. Diffuse reflections are produced when illumination reflects off a rough surface. The rough surface causes the illumination to reflect off the surface in many different directions. Specular reflections are produced when light reflects off a smooth surface. Because the surface is smooth, the light reflects off the surface at a well-defined angle.

Captured image data of the identity document 40 may be analyzed to determine whether the reflected light matches the expected type of reflection. The identity document 40 may be made from layers of polycarbonate and have a smooth surface. As a result, illumination that reflects off the document 40 should be specular and thus facilitate determining that the identity document 40 is authentic. Diffusely reflected light would indicate the light was reflected off a rough surface, for example paper or cardboard, and would facilitate determining that the identity document 40 is fraudulent.

The color spectrum of individual pixels or groups of pixels in the image of the identity document 40 that results from the applied illumination may be analyzed to facilitate determining whether the identity document 40 is authentic. The color spectrum includes the red, green, and blue color components of light. The intensity of the red, green, and blue components of light for each pixel may be measured and compared against the criteria for each pixel. Alternatively, or additionally, the intensity of the red, green and blue components may be measured for a group of pixels such that the color components for different areas of the identity document may be measured and compared against the respective criteria for corresponding areas of the document. Determining the color spectrum measurements comply with the criteria facilitates determining the identity document is authentic. However, if the color spectrum measurements do not comply with the criteria, the identity document may be fraudulent.

Figures 9, 10, 11:
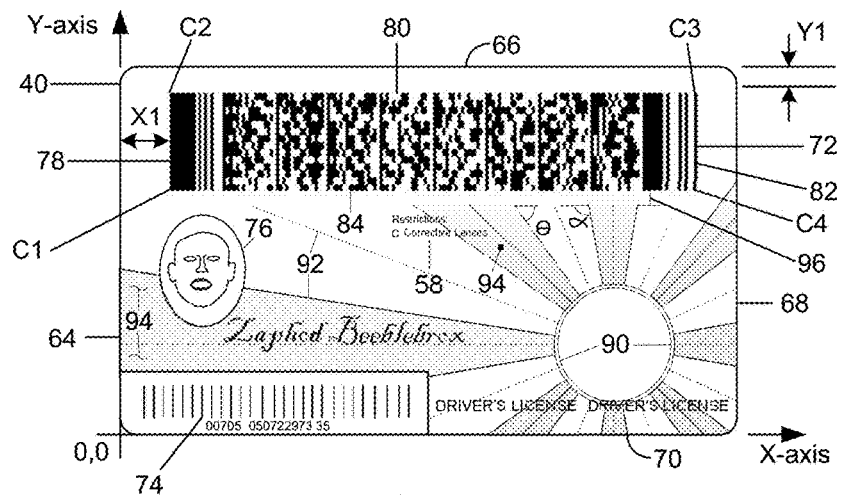
FIG. 9 is a diagram illustrating an image of the example second side of the identity document as shown in FIG. 4, further including substrate topology.
FIG. 10 is a diagram illustrating an image of another example second side of the identity document as shown in FIG. 4, without the PDF417 barcode 72 and the barcode 74.
FIG. 11 is an expanded view of a PDF417 barcode included on the second side of the identity document as shown in FIG. 4.

The information shown in FIG. 9 is the same information shown in FIG. 4 as described in more detail below. As such, features illustrated in FIG. 9 that are identical to features illustrated in FIG. 4 are identified using the same reference numerals used in FIG. 4.

FIG. 9 is a diagram illustrating an image of the example second side of the identity document 40 implemented using the ID-1 card type standard as shown in FIG. 4, further including substrate topology for the identity document 40. The substrate topology complies with the class to which the ID-1 card type belongs. The topology includes a region 90, redials extending away from the region 90, and shading 94 between pairs of radials 92.

The region 90 may be located in the lower right-hand corner of the second side of the identity document 40. Alternatively, the region 90 may be in any location on the second side. The region 90 may be any geometric shape, for example, circular and may have any patterns delineated therein. For example, a security pattern may be delineated within the region 90. Alternative shapes for the region 90 include, but are not limited to, square, rectangle, oval or diamond.

The radials 92 are lines that extend radially from a center of the region 90 towards the PDF417 barcode 72, the left edge 64, the right edge 68, and the bottom edge 70 of the identity document 40. The radials 92 may form angles with the fourth rectangular side 84 of the PDF417 barcode, the left edge 64, the right edge 68, and the bottom edge 70 of the identity document 40. For example, the angle between the fourth rectangular side 84 and a radial 92 may be theta (θ) while the angle between the fourth rectangular side 84 and a different radial 92 may be alpha (a). Additionally, or alternatively, any of the radials 92 may form an angle with any of the rectangular sides 78, 80, 82, and 84 of the PDF417 barcode 72. The angles between the radials 94 and the side 84 and the edges 64, 68, and 70 comport with the criteria established for the identity document 40.

Although radials 92 are described herein as lines extending radially from the center of the region 90, it is contemplated by the present disclosure that radials 92 may alternatively be lines that extend away from the region 90 in a direction that is not radial to the center of the region 90.

Areas 94 between pairs of the radials 92 may be shaded in accordance with the criteria established for the identity document 40. The shading may be created using security ink including any one or combination of chemically reactive ink, infrared fluorescent ink, infrared dropout ink, metallic ink, pearlescent ink, iridescent ink, metameric ink, phosphorescent ink, tagged ink, thermochromatic ink, and ultraviolet fluorescence ink. The shaded areas 94 comport with the criteria established for the class of the ID-1 document.

Because the identity document 40 for the embodiments described herein is implemented using the ID-1 card type standard, the radials 92, angles, and shaded areas 94 comply with the respective criteria established for the class to which the ID-1 card type belongs.

The shaded areas 94 between radials 92 may also extend towards the PDF417 barcode 72. As a result, the shaded areas 94 may interact with margins 96 of the PDF417 barcode and the substrate of the identity document 40 to facilitate creating reflections unique to the identity document 40. Reflections off the area of interaction between the shading 94 and PDF417 barcode margins 96 may be different than those generated by an authentic identity document due to, for example, different shading or different substrate materials. That is, different reflections may indicate that the identity document 40 in a captured image has shading or a substrate different than that required by the established criteria. Such different reflections may facilitate determining that the identity document in the captured image is fraudulent.

It should be understood that the margin 96 extends about the entire perimeter of the PDF417 barcode 72 and can extend away from the PDF417 barcode 72 by any distance, for example, one or two millimeters. The distance should comply with the respective criteria established for the class to which the ID-1 card type belongs.

The color spectrum of individual pixels or groups of pixels at the interaction between the shading 94 and PDF417 barcode margins 96 may also be analyzed to facilitate determining whether an identity document is authentic. The intensity of the red, green, and blue components of light for each pixel may be measured and compared against the criteria for each pixel. Determining the color spectrum measurements comply with the criteria facilitates determining the identity document is authentic. However, if the color spectrum measurements do not comply with the criteria, the identity document may be fraudulent.

It should be appreciated that the topology of identity documents, for example driver's licenses, implemented using the ID-1 card type standard may vary by the issuing state or province. Thus, for example, a driver's license issued by the state of California may have a different topology than a driver's license issued by the state of Florida.

The information shown in FIG. 10 includes some of the same information shown in FIG. 4 as described in more detail below. As such, features illustrated in FIG. 10 that are identical to features illustrated in FIG. 4 are identified using the same reference numerals used in FIG. 4.

FIG. 10 is a diagram illustrating an image of another example second side of the identity document 40 implemented using the ID-1 card type standard as shown in FIG. 4; however, the PDF417 barcode 72 and the barcode 74 are not included. Rather, a different one-dimensional barcode 98 is provided instead of the barcode 74. The barcode 98 is located in the lower left-hand corner of the identity document 40. Alternatively, the barcode 98 may be located anywhere on the identity document 40 that facilitates determining the authenticity of an identity document as described herein.

The barcode 98 is rectangular so has four rectangular sides. The barcode 98 includes a first rectangular side 100, a second rectangular side 102, a third rectangular side 104 and a fourth rectangular side 106. The first rectangular side 100 is parallel to the left edge 64, the second rectangular side 102 is parallel to the top edge 66, the third rectangular side 104 is parallel to the right edge 68, and the fourth rectangular side 106 is parallel to the bottom edge 70.

The cartesian coordinate system may be used to facilitate calculating the dimensions of the barcode 98, the location of the barcode 98 on the second side, and the orientation of the barcode 98 on the second side of the identity document 40. The information on the second side of the identity document 40 complies with the established criteria for the class of the identity document 40.

The barcode 98 may include features similar to those described herein for the PDF417 barcode 72. For example, features for the barcode 98 may include, but are not limited to, the dimensions of the barcode 98, the location of the barcode 98 on the identity document 40, the orientation of the barcode 98 on the identity document 40, the reflection characteristics of the barcode 98, the color spectrum of the barcode 98, the number of columns in the barcode 98, and information obtained from the document.

Similar to the PDF417 barcode 72 described herein, the class of the identity document can be determined and the features of the barcode 98 can be analyzed for adherence to criteria established for barcodes 98 on the determined class of document. More specifically, the features of the barcode 98 can be analyzed for anomalies from the established criteria. For example, the identity document 40 can be classified as a driver's license and the features of the barcode 98 can be analyzed for adherence to the established criteria for driver's licenses. Any difference from the established criteria can be considered an anomaly. Determining the features of the barcode 98 are free of anomalies facilitates determining that the identity document may be authentic. However, determining the features of the barcode 98 have at least one anomaly may indicate that the identity document is fraudulent.

It is contemplated by the present disclosure that a margin 108 extends about the entire perimeter of the barcode 98 and can extend away from the barcode 98 by any distance, for example, one or two millimeters. The distance should comply with the respective criteria established for the class to which the ID-1 card type belongs.

The identity document 40 also includes a substrate topology that complies with the class to which the ID-1 card type belongs. The substrate topology can include, for example, a Guilloche pattern (not shown) or any other type of pattern that enhances security. The substrate topology is different than the substrate topology shown in FIG. 9. Additionally, the identity document 40 can include a text 110 positioned beneath the barcode 98 inside or outside the margin 108. Alternatively, the text 110 can be located anywhere on the identity document 40. The text 110 can be any sequence of letters, numbers, and syntax, or any combination thereof, for example, *332333322708684*. Although positioned beneath the barcode 98 as described herein, the text 110 may alternatively be located anywhere on the identity document 40.

The text 110 can extend into and/or interact with the margin 108 of the identity document 40 to facilitate creating reflections unique to the identity document 40. The topology may also extend into the margin 108 to facilitate creating reflections unique to the identity document 40. When the substrate topology extends into the margin 108, the text 110 may interact with the margin 108 and the substrate topology to facilitate creating reflections unique to the identity document 40.

Reflections off the area of interaction within the margin 108 may be different than those generated by an authentic identity document due to, for example, different shading or different substrate materials. That is, different reflections may indicate that the identity document 40 in a captured image has shading or a substrate different than that required by the established criteria. Such different reflections may facilitate determining that the identity document in the captured image is fraudulent.

The information shown in FIG. 11 is the same information shown in FIG. 4 as described in more detail below. As such, features illustrated in FIG. 11 that are identical to features illustrated in FIG. 4 are identified using the same reference numerals used in FIG. 4.

FIG. 11 is an expanded view of the PDF417 barcode 72 as shown in FIG. 4, further including three example row designations R1, R2 and R3 and three example column designations Col 1, Col 2, and Col 3. Although three example row and column designations are shown, it should be understood that there are more rows and columns and that the number of rows and columns vary according to established criteria. The PDF417 barcode 72 includes several sections which each include clusters of codewords made from black ink and white spaces. The sections also include the rows and columns. The rows, columns, and codewords may also be used to facilitate determining whether the PDF417 barcode is authentic.

The codewords are the encoded information stored in the PDF417 barcode. The rows, columns, and encoding are together referred to herein as the topology of the PDF417 barcode. The topology for the PDF417 barcode of an authentic identity document 40 is unique so can be used to facilitate determining the authenticity of an identity document in a captured image. Determining that the PDF417 barcode topology of an identity document in a captured image comports with the established topology criteria for the identity document class, facilitates determining the identity document in the captured image is authentic. Otherwise, the identity document in the captured image may be fraudulent.

More specifically, the number of rows, columns and codewords in the PDF417 barcode 72 may be counted and compared against the numbers established by the respective criteria for PDF417 barcodes on the class of document determined for the identity document 40. Determining that the numbers of rows, columns, and codewords comply with the criteria, facilitates determining that the identity document may be authentic. However, if the numbers do not comply with the criteria, the identity document may be fraudulent.

The codewords are printed symbols made of black and white spaces. The printed symbols may also be used to facilitate determining whether the identity document 40 is authentic. It is contemplated by the present disclosure that the black and white areas across rows and columns of the PDF417 barcode can be measured and compared against the established criteria. Determining the measurements comply with the criteria facilitates determining the identity document may be authentic. However, if the measurements do not comply with the criteria, the identity document may be fraudulent.

PDF417 barcodes inherently include X and Y-dimensions that are not related to the cartesian coordinate system described herein with regard to the second side of the identity document 40. The X-dimension is the width of the bar with the smallest width within a codeword. The Y-dimension is the height of each column in the PDF417 barcode.

The X dimensions and Y-dimensions of codewords can be measured and compared against the corresponding PDF417 barcode criteria established for the class of the identity document 40. For example, the established PDF417 barcode criteria may be for a Virginia Driver's license issued in 2018. Complying with the established criteria facilitates determining the identity document 40 may be authentic. However, when either the X or Y dimension is noncompliant the identity document 40 may be fraudulent.

The PDF417 barcode 72 may be visually inspected by a person to determine the class to which the identity document 40 is expected to belong and other expected information about the document. Other expected information includes, but is not limited to, the entity that issued the identity document 40 and the address 48. The entity may include a country and/or a state or province within a country. For example, upon inspecting the PDF417 barcode, it may be determined that the identity document is expected to be a driver's license issued by the state of Virginia in the United States of America. Text information obtained from the first side of the document can include, but is not limited to, the class of document and the entity that issued the identity document 40. The obtained information may indicate that the document is a driver's license issued by the state of Virginia.

The information obtained from the first side of the document can be compared against the corresponding expected information. If the obtained and expected information agree, the identity document may be authentic. However, if the obtained and expected information disagree the identity document may be fraudulent. Thus, for the example described above, the expected and obtained issuing entity is the state of Virginia and the expected and obtained class of document is a driver's license. As a result, the identity document 40 for this example may be authentic. Although the PDF417 barcode 72 is visually inspected as described herein, it is contemplated by the present disclosure that the PDF417 barcode 72 may alternatively be inspected automatically using the electronic device 10, the server 12 or other like computing device.

Figure 12:
FIG. 12 is an expanded view of the barcode as shown in FIG. 10, including text positioned within a margin.

The information shown in FIG. 12 is the same information shown in FIG. 10 as described in more detail below. As such, features illustrated in FIG. 12 that are identical to features illustrated in FIG. 10 are identified using the same reference numerals used in FIG. 10.

FIG. 12 is an expanded view of the barcode 98 as shown in FIG. 10, including the text 110 positioned within the margin 108. The characters that make-up the text 110 are arranged horizontally and are uniformly spaced apart. Reflections off the area of the margin 108 including the text 110 should comply with those expected from the class to which the ID-1 card type belongs.

Figure 13:
FIG. 13 is an expanded view of the barcode as shown in FIG. 12, including the text positioned within the margin; however, some of the text is skewed.

The information shown in FIG. 13 is the same information shown in FIG. 12 as described in more detail below. As such, features illustrated in FIG. 13 that are identical to features illustrated in FIG. 12 are identified using the same reference numerals used in FIG. 12.

FIG. 13 is an expanded view of the barcode 98 as shown in FIG. 12, including the text 110 positioned within the margin 108. However, some of the characters that make-up the text 110 are not arranged horizontally but are skewed compared to the other characters in the text 110. More specifically, the characters 32333 do not horizontally align with the other characters in the text 110. Rather, the characters 32333 are skewed relative to the other characters. Reflections off the area of the margin 108 including the text 110 should comply with those expected from the class to which the ID-1 card type belongs. However, because the characters 32333 are skewed the reflections are different than expected. Such different reflections may facilitate determining that the identity document in the captured image is fraudulent.

Although the text 110 and substrate topology are described herein as extending into and interacting with the margin 108, it is contemplated by the present disclosure that a holographic laminate may alternatively, or additionally, be applied to the identity document 40 and can extend into the margin 108 to interact with the substrate topology to facilitate creating reflections unique to the identity document 40. Reflections off the area of the margin 108 including the holographic laminate should comply with those expected from the class to which the ID-1 card type belongs. Such different reflections may facilitate determining that the identity document in the captured image is fraudulent.

Figure 14:
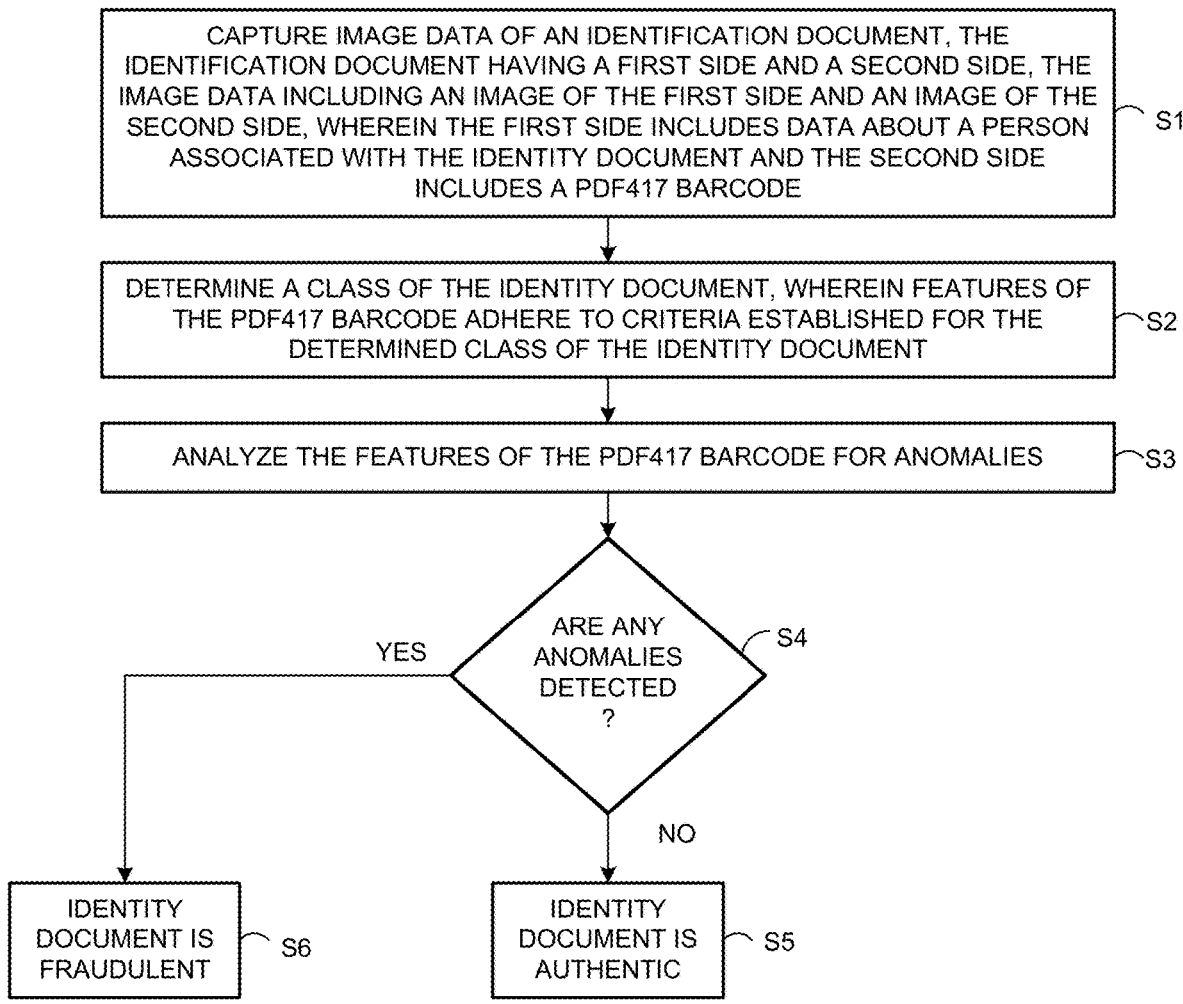
FIG. 14 is a flowchart illustrating an example method and algorithm for determining the authenticity of an identity document according to an embodiment of the present disclosure.

FIG. 14 is a flowchart illustrating an example method and algorithm for determining the authenticity of an identity document according to an embodiment of the present disclosure. FIG. 14 illustrates example steps performed when the electronic device 10 runs software 39 stored in the memory 20 to determine the authenticity of an identity document.

In step S1, the software 39 executed by the processor 18 causes the electronic device 10 to capture image data of an identity document 40 having a first and a second side. The image data can include an image of the first side and an image of the second side. The first side can include data about a person associated with the identity document 40 and the second side can include the PDF417 barcode 72. It is contemplated by the present disclosure that any number and/or combination of features 88 can be analyzed to facilitate determining whether the identity document is authentic.

Next, in step S2 the software 39 executed by the processor 18 causes the electronic device 10 to determine the class of the identity document. In step S3, the software 40 executed by the processor 18 causes the electronic device 10 to analyze the features 88 to detect any anomalies. It is contemplated by the present disclosure that any number and/or combination of features 88 relating to the PDF417 barcode 72 can be analyzed to detect anomalies.

In step S4, the software 39 executed by the processor 18 causes the electronic device 10 to determine whether any anomalies have been detected. When the features of the PDF417 barcode are free of anomalies, the identity document is determined to be authentic. Next, in step S5, the software 39 executed by the processor 18 causes the electronic device 10 to determine the identity document is authentic. When the features of the PDF417 barcode include at least one anomaly, the identity document is determined to be fraudulent. Thus, in step S4, if at least one anomaly is detected in the features of the PDF417 barcode, in step S6, the electronic device 10 determines the identity document is fraudulent.

Although the identity document is considered fraudulent if at least one anomaly is detected in the analyzed features of the PDF417 barcode, it is contemplated by the present disclosure that an identity document may be considered authentic if one or more anomalies are detected. For example, the number of anomalies may be any number that provides a desired level of accuracy in authenticity detection results. The number of anomalies may depend on the number of features analyzed. For example, when all twelve of the features 88 described herein are analyzed the number of permitted anomalies may be two (2).

Figure 15:
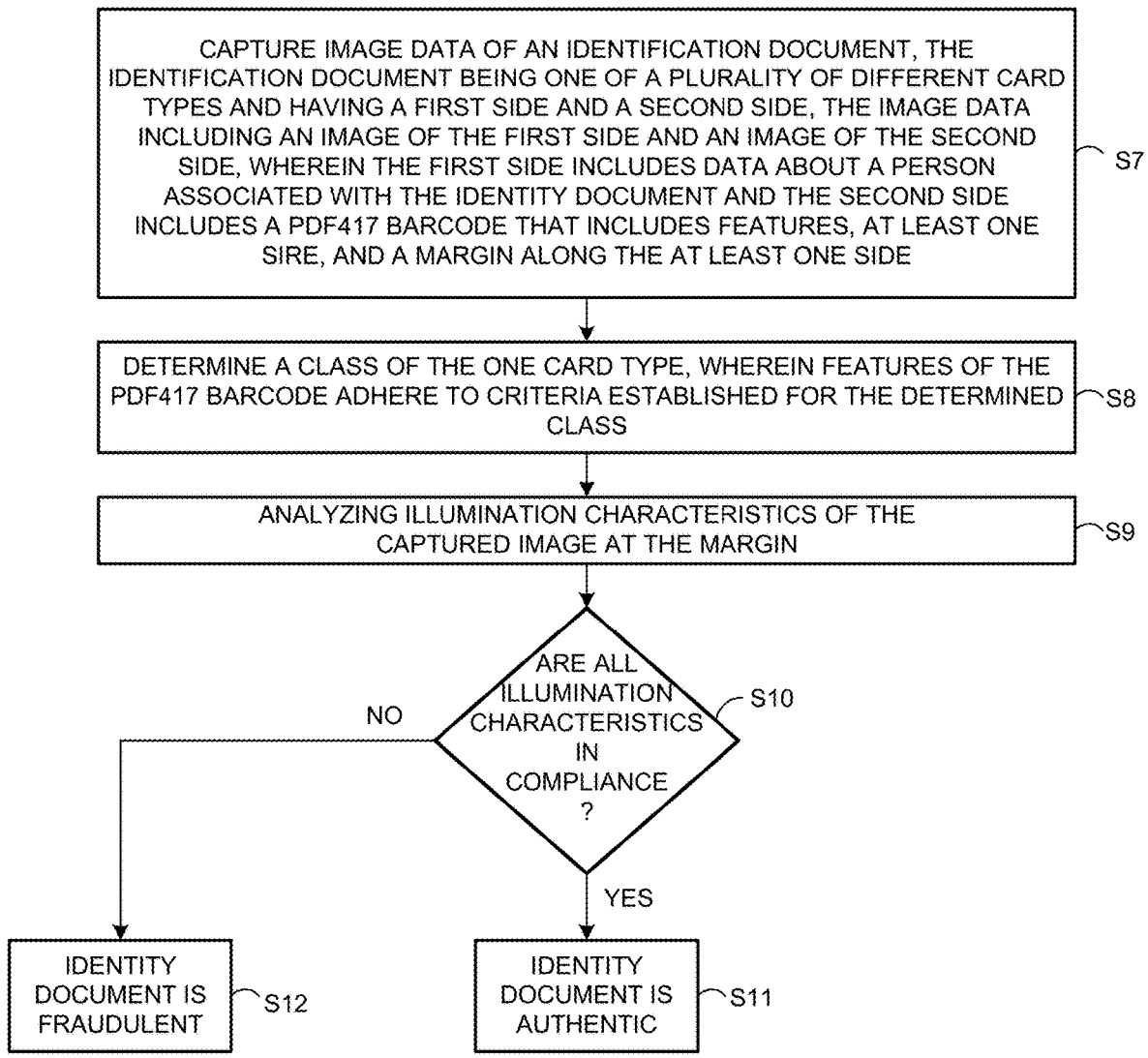
FIG. 15 is a flowchart illustrating another example method and algorithm for determining the authenticity of an identity document according to an alternative embodiment of the present disclosure.

FIG. 15 is a flowchart illustrating another example method and algorithm for determining the authenticity of an identity document according to an alternative embodiment of the present disclosure. FIG. 15 illustrates example steps performed when the electronic device 10 runs software 39 stored in the memory 20 to determine the authenticity of an identity document.

In step S7, the software 39 executed by the processor 18 causes the electronic device 10 to capture image data of an identity document 40 having a first and a second side. The identity document may be any one of a plurality of different card types. For example, the identity document may be an ID-1, ID-2, or ID-3 card type. The identity document 40 described in this example method is a Virginia driver's license implemented using the ID-1 card type standard.

The image data can include an image of the first side and an image of the second side. The first side can include data about a person associated with the identity document 40 and the second side can include the PDF417 barcode 72. The PDF417 barcode 72 includes features 88, at least one side, and a margin 96 along the at least one side. It is contemplated by the present disclosure that any number and/or combination of features 88 can be analyzed to facilitate determining whether the identity document is authentic.

Next, in step S8 the software 39 executed by the processor 18 causes the electronic device 10 to determine the class of the card type, which for this example method is the ID-1 card type. In step S9, the software 39 executed by the processor 18 causes the electronic device 10 to analyze illumination characteristics of the captured image in the margin 96 of the PDF417 barcode 72. Illumination characteristics include, but are not limited to, reflections off the PDF417 barcode, the distribution of the intensity of light across the PDF417 barcode or any part of the identity document 40, and patterns in light across the PDF417 barcode or any part of the identity document 40. Analysis of the illumination characteristics can include measuring the color spectrum of pixels in the captured image at the margin 96 and using the measurements to, for example, analyze the distribution of illumination intensity across the margin 96 and/or to analyze a pattern of illumination across the margin 96. Additionally, or alternatively, the measurement may be used to analyze any other illumination characteristic that may be used to facilitate verifying the authenticity of an identity document.

In step S10, the software 39 executed by the processor 18 causes the electronic device 10 to determine whether any analyzed illumination characteristic is out of compliance with criteria established for the determined class. When all of the analyzed illumination characteristics comply with the established criteria, in step S11, the software 39 executed by the processor 18 causes the electronic device 10 to determine the identity document 40 is authentic. However, when at least one measured illumination characteristic does not comply with the established criteria, in step S12, the electronic device 10 determines the identity document 40 is fraudulent.

Although the identity document 40 is considered fraudulent if at least one measured illumination characteristic does not comply with the established criteria, it is contemplated by the present disclosure that the identity document 40 may be considered authentic if one or more illumination characteristic measurements do not comply with the established criteria. The number of illumination characteristic measurements that do not comply with the established criteria may be any number that provides a desired level of accuracy in authenticity detection results.

Using the methods and algorithms for determining the authenticity of an identity document as described herein enables quickly determining whether image data includes an image of an authentic document. As a result, the method and algorithm facilitate enhancing the accuracy and trustworthiness of document review results while enhancing security and facilitating a reduction in review costs.

Although the example methods and algorithms for determining the authenticity of an identity document as described herein analyze PDF417 barcodes and one-dimensional barcodes, it is contemplated by the present disclosure that a QR code on the identity document 40 may additionally, or alternatively, similarly be analyzed to facilitate determining whether the identity document 40 is authentic or fraudulent. A QR code is a type of barcode. A QR code could, for example, adhere to the standard established for electronic visas and could, for example, operate to facilitate storing and transmitting visa information.

It is contemplated by the present disclosure that the example methods and algorithms described herein may be conducted entirely by the electronic device 10; partly by the electronic device 10 and partly by the server 12; partly by the electronic device 10, partly by the camera 14 and partly by the server 12; partly by the camera 14 and partly by the server 12; entirely by the camera 14; or, by any other combination of other servers (not shown), electronic devices (not shown), or computers (not shown) operable to communicate with the electronic device 10, the server 12, and the camera 14 via the network 16. Furthermore, data described herein as being stored in the electronic device 10 may alternatively, or additionally, be stored in any other server (not shown), electronic device (not shown), or computer (not shown) operable to communicate with the electronic device 10 via a network.

Additionally, the example methods and algorithms described herein may be implemented with any number and organization of computer program components. Thus, the methods and algorithms described herein are not limited to specific computer-executable instructions. Alternative example methods and algorithms may include different computer-executable instructions or components having more or less functionality than described herein.

The example methods and/or algorithms described above should not be considered to imply a fixed order for performing the method and/or algorithm steps. Rather, the method and/or algorithm steps may be performed in any order that is practicable, including simultaneous performance of at least some steps. Moreover, the method and/or algorithm steps may be performed in real time or in near real time. It should be understood that for any method and/or algorithm described herein, there can be additional, fewer, or alternative steps performed in similar or alternative orders, or in parallel, within the scope of the various embodiments, unless otherwise stated. Furthermore, the invention is not limited to the embodiments of the methods and/or algorithms described above in detail.

What is claimed is:

1. A method for determining the authenticity of an identity document comprising the steps of:
   capturing, by an electronic device, image data of an identity document, the identity document being one of a plurality of different card types, the image data including an image of a barcode, the barcode including features, at least one side and a margin along the at least one side;
   determining a class of the one card type, wherein features of the barcode adhere to criteria established for the determined class;
   measuring the color spectrum of pixels in the margin;
   at least one of analyzing a distribution of illumination intensity across the margin using the color spectrum measurements and analyzing a pattern of illumination across the margin using the color spectrum measurements;
   comparing results of the at least one analysis against the respective criteria for barcodes on the determined class of document; and
   in response to determining all of the results comply with the respective criteria, determining the identity document is authentic.

2. The method according to claim 1, wherein the identity document includes a Guilloche pattern extending into the margin.

3. A method for determining the authenticity of an identity document comprising the steps of:
   capturing, by an electronic device, image data of an identity document, the identity document being one of a plurality of different card types, the image data including an image of a barcode, the barcode including features, at least one side and a margin along the at least one side, wherein text is in the margin;
   determining a class of the one card type, wherein features of the barcode adhere to criteria established for the determined class;
   measuring the color spectrum of pixels in the margin;
   analyzing a pattern of illumination across the margin using the color spectrum measurements;
   comparing results of the analysis against the respective criteria for barcodes on the determined class of document; and
   in response to determining all of the results comply with the respective criteria, determining the identity document is authentic.

4. An electronic device for determining authenticity of an identity document comprising:
   a processor; and
   a memory configured to store data, said electronic device being associated with a network and said memory being in communication with said processor and having instructions stored thereon which, when read and executed by said processor, cause said electronic device to:
   capture image data of an identity document, the identity document being one of a plurality of different card types, the image data including an image of a barcode including features, at least one side and a margin along the at least one side;
   determine a class of the card type, wherein features of the barcode adhere to criteria established for the determined class;
   measure the color spectrum of pixels in the margin;
   analyze at least one of a distribution of illumination intensity across the margin using the color spectrum measurements and a pattern of illumination across the margin using the color spectrum measurements;
   compare results of the at least one analysis against the respective criteria for barcodes on the determined class of document; and
   in response to determining all of the results comply with the respective criteria, determine the identity document is authentic.

5. The electronic device according to claim 4, wherein the identity document includes a Guilloche pattern extending into the margin.

6. An electronic device for determining authenticity of an identity document comprising:
   a processor; and
   a memory configured to store data, said electronic device being associated with a network and said memory being in communication with said processor and having instructions stored thereon which, when read and executed by said processor, cause said electronic device to:
   capture image data of an identity document, the identity document being one of a plurality of different card types, the image data including an image of a barcode including features, at least one side and a margin along the at least one side, wherein text is in the margin;

determine a class of the card type, wherein features of the barcode adhere to criteria established for the determined class;

measure the color spectrum of pixels in the margin;

analyze a pattern of illumination across the margin using the color spectrum measurements;

compare results of the analysis against the respective criteria for barcodes on the determined class of document; and in response to determining all of the results comply with the respective criteria, determine the identity document is authentic.

* * * * *